United States Patent
Gong et al.

(10) Patent No.: US 10,597,757 B2
(45) Date of Patent: Mar. 24, 2020

(54) DUCTILE HIGH-TEMPERATURE MOLYBDENUM-BASED ALLOYS

(71) Applicant: QUESTEK INNOVATIONS LLC, Evanston, IL (US)

(72) Inventors: Jiadong Gong, Evanston, IL (US); David R. Snyder, Des Plaines, IL (US); Jason T. Sebastian, Chicago, IL (US); William Arthur Counts, Cupertino, CA (US); Abhijeet Misra, Cupertino, CA (US); James A. Wright, Los Gatos, CA (US)

(73) Assignee: QUESTEK INNOVATIONS LLC, Evanston, IL (US)

( * ) Notice: Subject to any disclaimer, the term of this patent is extended or adjusted under 35 U.S.C. 154(b) by 69 days.

(21) Appl. No.: 15/305,998

(22) PCT Filed: Apr. 14, 2015

(86) PCT No.: PCT/US2015/025687
§ 371 (c)(1),
(2) Date: Oct. 21, 2016

(87) PCT Pub. No.: WO2016/003520
PCT Pub. Date: Jan. 7, 2016

(65) Prior Publication Data
US 2017/0044646 A1 Feb. 16, 2017

Related U.S. Application Data

(60) Provisional application No. 61/983,362, filed on Apr. 23, 2014.

(51) Int. Cl.
*C22C 27/04* (2006.01)
*B21C 23/00* (2006.01)
(Continued)

(52) U.S. Cl.
CPC ............ *C22C 27/04* (2013.01); *B21C 23/002* (2013.01); *C22C 1/02* (2013.01); *C22F 1/06* (2013.01);
(Continued)

(58) Field of Classification Search
CPC ........ C22C 1/02; C22C 27/04; B21C 23/002; C22F 1/06; F01D 25/005; F02K 9/97; F05D 2230/26; F27D 11/08
See application file for complete search history.

(56) References Cited

U.S. PATENT DOCUMENTS 2,678,268 A 5/1954 Ham et al.
2,678,272 A * 5/1954 Ham ..................... C22C 27/04
420/429

(Continued)

FOREIGN PATENT DOCUMENTS

EP 0804627 B1 11/1997
GB 741361 11/1955
(Continued)

OTHER PUBLICATIONS

Search Report of the International Searching Authority for Application No. PCT/US15/25687 dated Dec. 30, 2015 (9 pages).
(Continued)

*Primary Examiner* — Ngoc-Yen Nguyen
(74) *Attorney, Agent, or Firm* — Michael Best & Friedrich LLP

(57) ABSTRACT

Alloys, processes for preparing the alloys, and articles including the alloys are provided. The alloys can include, by weight, about 0.01% to about 1% vanadium, 0% to about 0.04% carbon, 0% to about 8% niobium, 0% to about 1% titanium, 0% to about 0.04% boron, 0% to about 1% tungsten, 0% to about 1% tantalum, 0% to about 1% hafnium, and 0% to about 1% ruthenium, the balance
(Continued)

essentially molybdenum and incidental elements and impurities.

20 Claims, 6 Drawing Sheets

(51) Int. Cl.
  *F02K 9/97* (2006.01)
  *F01D 25/00* (2006.01)
  *C22C 1/02* (2006.01)
  *F27D 11/08* (2006.01)
  *C22F 1/06* (2006.01)

(52) U.S. Cl.
  CPC .............. *F01D 25/005* (2013.01); *F02K 9/97* (2013.01); *F27D 11/08* (2013.01); *F05D 2230/26* (2013.01)

(56) References Cited

U.S. PATENT DOCUMENTS

| | | |
|---|---|---|
| 2,883,284 A | 4/1959 | Lawthers |
| 3,297,496 A | 1/1967 | Chang |
| 4,261,412 A | 4/1981 | Soykan et al. |
| 4,430,296 A | 2/1984 | Koizumi et al. |
| 5,595,616 A | 1/1997 | Berczik |
| 2008/0017278 A1 | 1/2008 | Nagae et al. |
| 2014/0141281 A1* | 5/2014 | Kadokura ............... C22C 27/04 428/662 |
| 2014/0322068 A1* | 10/2014 | Conduit ................... C22C 27/04 420/429 |

FOREIGN PATENT DOCUMENTS

| | | |
|---|---|---|
| GB | 1358891 | 7/1974 |
| SU | 411148 A1 | 1/1974 |

OTHER PUBLICATIONS

Written Opinion of the International Searching Authority for Application No. PCT/US15/25687 dated Dec. 30, 2015 (7 pages).
Tietz et al., "Behavior and Properties of Refractory Metals," Palo Alto: Stanford University Press, 1965, p. 175.
Chinese Patent Office Action for Application No. 201580033290.2 dated Dec. 26, 2017 (18 pages, English translation included).
Extended European Search Report and Search Opinion for Application No. 15815999.6 dated Nov. 20, 2017 (8 pages).
Chinese Patent Office Action for Application No. 201580033290.2 dated Mar. 14, 2019 (14 pages, English translation included).
Encyclopedia of Chemical Processing, vol. 12, Wood and Forest Chemicals—Prostaglandin (mu-qian), pp. 62-64, Nov. 1996 (8 pages, statement of relevance included).
European Patent Office Action for Application No. 15815999.6 dated Apr. 5, 2019 (4 pages).

* cited by examiner

DUCTILE HIGH-TEMPERATURE MOLYBDENUM-BASED ALLOYS

CROSS-REFERENCE TO RELATED APPLICATIONS

This application claims priority to U.S. Provisional Application 61/983,362, filed Apr. 23, 2014, and is herein incorporated by reference in its entirety.

STATEMENT OF GOVERNMENT INTEREST

This invention was made with government support under Contract Nos. W31P4Q-09-C-0450 and W91CRB-11-C-0014, awarded by the Defense Advanced Research Projects Agency. The government has certain rights in the invention.

BACKGROUND

Rocket propulsion applications as well as the next generation of higher efficiency turbine engines for both aerospace and power generation require higher temperatures than can be provided by current nickel-based alloys. The current maximum operating temperature (~1100° C.) of nickel-based alloys approaches 90% of their melting temperature. This imposes a theoretical limit on their maximum use temperature. Accordingly, there exists a need for alloys that can meet the demands of the foregoing high temperature applications and other demanding commercial services.

SUMMARY

In one aspect, disclosed is an alloy comprising, by weight, about 0.01% to about 1% vanadium, 0% to about 0.04% carbon, 0% to about 8% niobium, 0% to about 1% titanium, 0% to about 0.04% boron, 0% to about 1% tungsten, 0% to about 1% tantalum, 0% to about 1% hafnium, and 0% to about 1% ruthenium, the balance essentially molybdenum and incidental elements and impurities.

In another aspect, disclosed is an alloy comprising, by weight, about 0.01% to about 1% vanadium, about 0.01% to about 0.02% carbon, 0% to about 8.0% niobium, 0% to about 1% titanium, and 0% to about 0.04% boron, the balance essentially molybdenum and incidental elements and impurities.

In another aspect, disclosed is an alloy comprising, by weight, about 0.05% to about 0.55% vanadium, about 0.01% to about 0.02% carbon, 0% to about 8.0% niobium, 0% to about 0.5% titanium, and 0% to about 0.04% boron, the balance essentially molybdenum and incidental elements and impurities.

In another aspect, disclosed is an alloy produced by a process comprising: preparing a melt that includes, by weight, about 0.05% to about 0.55% vanadium, about 0.01% to about 0.02% carbon, 0% to about 8.0% niobium, 0% to about 0.5% titanium, and 0% to about 0.04% boron, the balance essentially molybdenum and incidental elements and impurities. The melt can be produced via double alternating current consumable electrode vacuum melting as ingots with specified dimensions. The ingots can be extruded (e.g., at 1350° C.) into shapes of specified dimensions.

In another aspect, disclosed is a manufactured article comprising an alloy that includes, by weight, about 0.05% to about 0.55% vanadium, about 0.01% to about 0.02% carbon, 0% to about 8.0% niobium, 0% to about 0.5% titanium, and 0% to about 0.04% boron, the balance essentially molybdenum and incidental elements and impurities.

DETAILED DESCRIPTION

Figure 1:
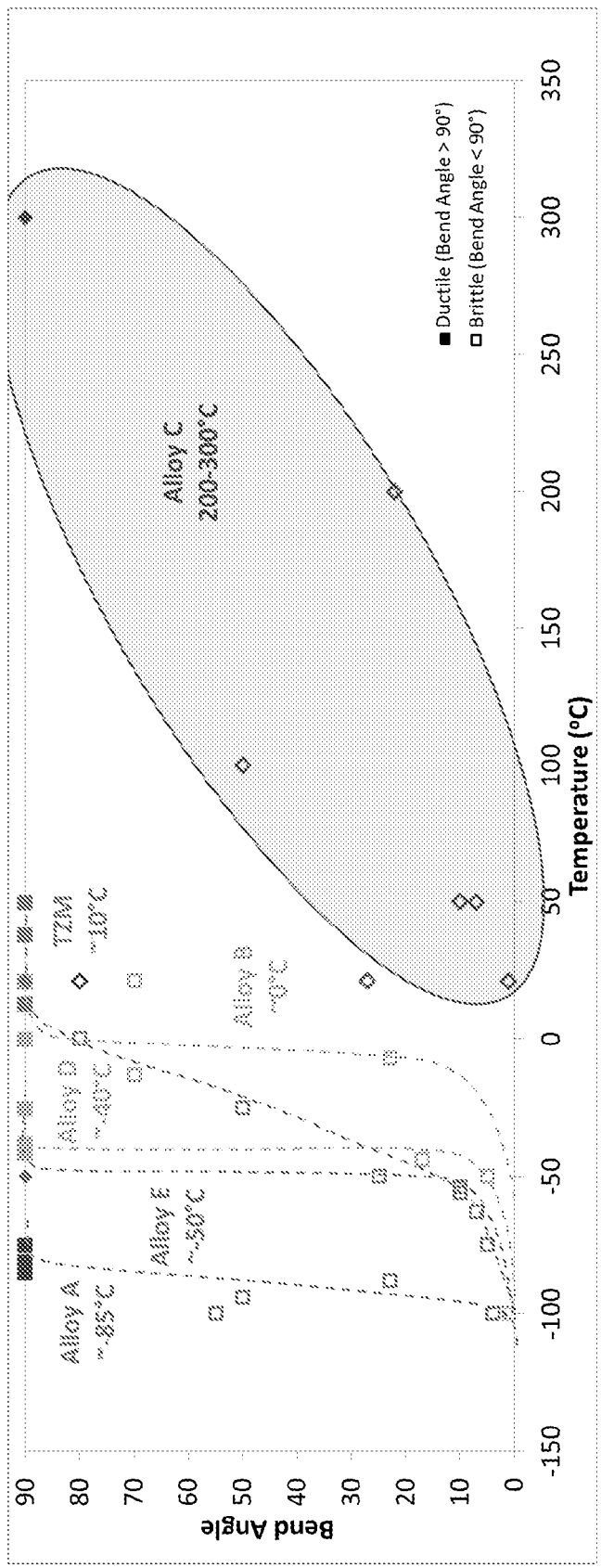
FIG. 1 is a graph depicting the ductile to brittle transition temperature (DBTT) for exemplary molybdenum-based alloys in comparison to the commercial alloy TZM.

Disclosed are molybdenum-based alloys, methods for making the alloys, and manufactured articles comprising the alloys. The disclosed alloys incorporate elements in amounts sufficient to enhance grain boundary cohesion. Such elements may include niobium, vanadium, ruthenium, boron, and carbon.

The molybdenum-based alloys exhibit improved physical properties relative to existing alloys. The alloys can provide high temperature performance exceeding the capabilities of existing nickel-based alloys. In addition, the disclosed molybdenum-based alloys can have one or more of high strength, resistance to inter-granule failure, and ductility superior to existing commercial molybdenum alloys.

Grain boundary engineering was used to enhance ductility of molybdenum alloys. Studies showed that decreasing the grain size in unalloyed molybdenum has beneficial effects on ductility, while the introduction of oxygen is detrimental. Density Functional Theory (DFT) calculations suggested that boron and carbon enhance cohesion of grain boundaries, while nitrogen and oxygen embrittle grain boundaries. In alloyed molybdenum, studies demonstrated that while large quantities of alloying elements in solid solution are detrimental to ductility, small quantities of vanadium, niobium, ruthenium and titanium are innocuous to ductility and zirconium, chromium and aluminum are detrimental to ductility.

DFT calculations were carried out to identify and verify grain boundary cohesion effects of various alloying elements. The results of these calculations demonstrate that vanadium, niobium, and ruthenium improve grain boundary cohesion and enhance ductility, while zirconium, titanium and aluminum embrittle grain boundaries and decrease ductility. In light of these results, the disclosed alloys were designed to incorporate elements in amounts sufficient to enhance grain boundary cohesion. Such elements may include niobium, vanadium, ruthenium, boron, and carbon.

In addition, the disclosed alloys incorporate particle forming elements that promote the formation of fine grain size and enhance the ductility of the alloy. Such particle forming elements may include carbon, boron, niobium, vanadium, titanium, tungsten, tantalum, hafnium, ruthenium and molybdenum. The particle forming elements may form carbide and boride particles that pin the grain boundary of the alloy. The carbide and boride particles may include, but are not limited to, niobium carbide, vanadium carbide, titanium carbide, and molybdenum boride, or a combination thereof.

The disclosed alloys' use of alternative elemental components can enhance the cohesion of grain boundaries, and thereby reduce the susceptibility to inter-granule failure and improve ductility.

While molybdenum has a melting temperature of 2623° C. and a low density, making it an attractive candidate to replace nickel in high performance alloy applications, its poor oxidation resistance and marginal ductility has limited its previous application. The most widely used molybdenum-based alloy is the Titanium-Zirconium-Molybdenum alloy, TZM (composed of 0.5% titanium, 0.1% zirconium, 0.02% carbon, balance molybdenum). TZM accounts for ~90% of commercial molybdenum-based alloys currently in use. The microstructure of TZM includes titanium and zirconium carbides that pin the grain boundaries and prevent recrystallization of the grain boundaries. This feature provides high temperature strength due to refined grain size. However, the titanium, zirconium, and carbon atoms remaining in the solution after the carbides are formed can segregate to the grain boundary interface and negatively affect the cohesive properties of the grain boundary. In turn, this can promote the commonly observed mode of failure in TZM, namely inter-granule failure during fracture. In other words, when stressed, common commercially available molybdenum alloys containing titanium and/or zirconium are susceptible to inter-granule failure during fracture, as segregation of titanium and zirconium to grain boundaries can embrittle the grain boundaries in these alloys. The disclosed alloys can overcome the disadvantages of TZM and provide superior performance.

I. Definitions of Terms

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

As used in the specification and the appended claims, the singular forms "a," "an" and "the" include plural references unless the context clearly dictates otherwise. The terms "comprise(s)," "include(s)," "having," "has," "can," "contain(s)," and variants thereof, as used herein, are intended to be open-ended transitional phrases, terms, or words that do not preclude the possibility of additional acts or structures. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Any recited range described herein is to be understood to encompass and include all values within that range, without the necessity for an explicit recitation.

II. Alloys

The disclosed alloys may comprise vanadium, carbon, niobium, titanium, boron, tungsten, tantalum, hafnium, ruthenium, and molybdenum, along with incidental elements and impurities.

The alloys may comprise, by weight, about 0.01% to about 1.0% vanadium, about 0% to about 0.04% carbon, 0% to about 8.0% niobium, 0% to about 1.0% titanium, 0% to about 0.04% boron, 0% to about 1.0% tungsten, 0% to about 1.0% tantalum, 0% to about 1.0% hafnium, and 0% to about 1.0% ruthenium, the balance essentially molybdenum and incidental elements and impurities. It is understood that the alloys described herein may consist only of the above-mentioned constituents or may consist essentially of such constituents, or in other embodiments, may include additional constituents.

The alloys may comprise, by weight, about 0.01% to about 1.0% vanadium, about 0.01% to about 0.02% carbon, 0% to about 8.0% niobium, 0% to about 1.0% titanium, and 0% to about 0.04% boron, the balance essentially molybdenum and incidental elements and impurities.

The alloys may comprise, by weight, about 0.05% to about 0.55% vanadium, about 0.01% to about 0.02% carbon, 0% to about 8.0% niobium, 0% to about 0.5% titanium, and 0% to about 0.04% boron, the balance essentially molybdenum and incidental elements and impurities.

The alloys may comprise, by weight, about 0.05% to about 0.55% vanadium, about 0.01% to about 0.02% carbon, 0% to about 0.54% niobium, 0% to about 0.5% titanium, and 0% to about 0.04% boron, the balance essentially molybdenum and incidental elements and impurities.

The alloys may comprise, by weight, about 0.01% to about 1.0% vanadium, about 0.05% to about 1.0% vanadium, about 0.07% to about 1.0% vanadium, about 0.08% to about 1.0% vanadium, about 0.09% to about 1.0% vanadium, about 0.01% to about 0.55% vanadium, about 0.05% to about 0.55% vanadium, about 0.07% to about 0.55% vanadium, about 0.08% to about 0.55% vanadium, about 0.09% to about 0.55% vanadium, about 0.07% to about 0.53% vanadium, about 0.05% to about 0.1% vanadium, about 0.07% to about 0.1% vanadium, about 0.08% to about 0.1% vanadium, about 0.09% to about 0.1% vanadium, about 0.32% to about 0.55% vanadium, about 0.41% to about 0.55% vanadium, or about 0.42% to about 0.55% vanadium. The alloys may comprise, by weight, 0.01% to 1.0% vanadium, 0.05% to 1.0% vanadium, 0.07% to about 1.0% vanadium, 0.08% to 1.0% vanadium, 0.09% to 1.0% vanadium, 0.01% to 0.55% vanadium, 0.05% to 0.55% vanadium, 0.07% to 0.55% vanadium, 0.08% to 0.55% vanadium, 0.09% to 0.55% vanadium, 0.07% to 0.53% vanadium, 0.05% to 0.1% vanadium, 0.07% to 0.1% vanadium, 0.08% to 0.1% vanadium, 0.09% to 0.1% vanadium, 0.32% to 0.55% vanadium, 0.41% to 0.55% vanadium, or 0.42% to 0.55% vanadium. The alloys may comprise, by weight, 0.01%, 0.02%, 0.03%, 0.04%, 0.05%, 0.051%, 0.052%, 0.053%, 0.054%, 0.055%, 0.056%, 0.057%, 0.058%, 0.059%, 0.06%, 0.061%, 0.062%, 0.063%, 0.064%, 0.065%, 0.066%, 0.067%, 0.068%, 0.069%, 0.07%, 0.071%, 0.072%, 0.073%, 0.074%0.075%, 0.076%, 0.077%, 0.078%, 0.079%, 0.08%, 0.081%, 0.082%, 0.083%, 0.084%, 0.085%, 0.086%, 0.087%, 0.088%, 0.089%, 0.09%, 0.091%, 0.092%, 0.093%, 0.094%, 0.095%, 0.096%, 0.097%, 0.098%, 0.099%, 0.1%, 0.2%, 0.3%, 0.31%, 0.32%, 0.33%, 0.34%, 0.35%, 0.36%, 0.37%, 0.38%, 0.39%, 0.4%, 0.41%, 0.42%, 0.43%, 0.44%, 0.45%, 0.46%, 0.47%, 0.48%, 0.49%, 0.5%, 0.51%, 0.52%, 0.53%, 0.54%, or 0.55% vanadium. The alloys may comprise, by weight, about 0.07% vanadium, about 0.08% vanadium, about 0.09% vanadium, about 0.32% vanadium, about 0.41% vanadium, or about 0.42% vanadium.

The alloys may comprise, by weight, 0% to about 0.04% carbon, about 0.01% to about 0.04% carbon, or about 0.01% to about 0.02% carbon. The alloys may comprise, by weight, 0% to 0.04% carbon, 0.01% to 0.04% carbon, or 0.01% to 0.02% carbon. The alloys may comprise, by weight, 0.001%, 0.002%, 0.003%, 0.004%, 0.005%, 0.006%, 0.007%, 0.008%, 0.009%, 0.01%, 0.011%, 0.012%, 0.013%, 0.014%, 0.015%, 0.016%, 0.017%, 0.018%, 0.019%, 0.02%, 0.021%, 0.022%, 0.023%, 0.024%, 0.025%, 0.026%, 0.027%, 0.028%, 0.029%, 0.03%, 0.031%, 0.032%, 0.033%, 0.034%, 0.035%, 0.036%, 0.037%, 0.038%, 0.039%, or 0.04% carbon. The alloys may comprise, by weight, about 0.01% carbon, about 0.011% carbon, about 0.012% carbon, about 0.014% carbon, about 0.015% carbon, about 0.02% carbon, about 0.03% carbon, or about 0.04% carbon.

The alloys may comprise, by weight, about 0% to about 8.0% niobium, about 0.01% to about 0.55% niobium, about 0.01% to about 0.15% niobium, about 0.07% to about 0.15% niobium, about 0.5% to about 0.55% niobium, about 6.0% niobium to about 8.0% niobium, or about 6.4% to about 6.5% niobium. The alloys may comprise, by weight, 0.01% to 0.55% niobium, 0.01% to 0.15% niobium, 0.07% to 0.15% niobium, 0.5% to about 0.55% niobium, 6.0% to 8.0% niobium, or 6.4% to 6.5% niobium. The alloys may comprise, by weight, 0.01%, 0.011%, 0.012%, 0.013%, 0.014%, 0.015%, 0.016%, 0.017%, 0.018%, 0.019%, 0.02%, 0.021%, 0.022%, 0.023%, 0.024%, 0.025%, 0.026%, 0.027%, 0.028%, 0.029%, 0.03%, 0.031%, 0.032%, 0.033%, 0.034%, 0.035%, 0.036%, 0.037%, 0.038%, 0.039%, 0.04%, 0.041%, 0.042%, 0.043%, 0.044%, 0.045%, 0.046%, 0.047%, 0.048%, 0.049%, 0.05%, 0.051%, 0.052%, 0.053%, 0.054%, 0.055%, 0.056%, 0.057%, 0.058%, 0.059%, 0.06%, 0.061%, 0.062%, 0.063%, 0.064%, 0.065%, 0.066%, 0.067%, 0.068%, 0.069%, 0.07%, 0.071%, 0.072%, 0.073%, 0.74%, 0.075%, 0.076%, 0.077%, 0.078%, 0.079%, 0.08%, 0.081%, 0.082%, 0.083%, 0.084%, 0.085%, 0.086%, 0.087%, 0.088%, 0.089%, 0.09%, 0.091%, 0.092%, 0.093%, 0.094%, 0.095%, 0.096%, 0.097%, 0.098%, 0.099%, 0.1%, 0.11%, 0.12%, 0.13%, 0.14%, 0.15%, 0.5%, 0.51%, 0.52%, 0.53%, 0.54%, 0.55%, 6.4%, 6.41%, 6.42%, 6.43%, 6.44%, 6.45%, 6.46%, 6.47%, 6.48%, 6.49%, or 6.5% niobium. The alloys may comprise, by weight, about 0.012%, about 0.071% niobium, about 0.54% niobium, or about 6.43% niobium.

The alloys may comprise, by weight, about 0% to about 0.5% titanium, or about 0.4% to about 0.5% titanium. The alloys may comprise, by weight, 0% to 0.5% titanium, or 0.4% to 0.5% titanium. The alloys may comprise, by weight, 0.4%, 0.41%, 0.42%, 0.43%, 0.44%, 0.45%, 0.46%, 0.47%, 0.48%, 0.49%, or 0.5% titanium. The alloys may comprise, by weight, about 0.41% titanium, about 0.43% titanium, or about 0.5% titanium.

The alloys may comprise, by weight, about 0% to about 0.04% boron, about 0.01% to about 0.04% boron, or about 0.024% to about 0.036% boron. The alloys may comprise, by weight, 0% to 0.04% boron, 0.01% to 0.4% boron, or 0.024% to 0.036% boron. The alloys may comprise, by weight, 0.024%, 0.025%, 0.026%, 0.027%, 0.028%, 0.029%, 0.031%, 0.032%, 0.033%, 0.034%, 0.035%, 0.036%, 0.037%, 0.038%, 0.039%, or 0.04% boron. The alloys may comprise, by weight, about 0.02% boron, about 0.024% boron, about 0.036% boron, or about 0.04% boron.

The alloys may comprise, by weight, 0% to about 1.0% tungsten, about 0.1% to about 1.0% tungsten, about 0.2% to about 1.0% tungsten, about 0.3% to about 1.0% tungsten, about 0.4% to about 1.0% tungsten, about 0.5% to about 1.0% tungsten, about 0.6% to about 1.0% tungsten, about 0.7% to about 1.0% tungsten, about 0.8% to about 1.0% tungsten, or about 0.9% to about 1.0% tungsten. The alloys may comprise, by weight, 0% to 1.0% tungsten, 0.1% to 1.0% tungsten, 0.2% to 1.0% tungsten, 0.3% to 1.0% tungsten, 0.4% to 1.0% tungsten, 0.5% to 1.0% tungsten, 0.6% to 1.0% tungsten, 0.7% to 1.0% tungsten, 0.8% to 1.0% tungsten, or 0.9% to 1.0% tungsten. The alloys may comprise, by weight, 0.1%, 0.2%, 0.3%, 0.4%, 0.5%, 0.6%, 0.7%, 0.8%, 0.9%, or 1.0% tungsten. The alloys may comprise, by weight, about 0.1% tungsten, about 0.2% tungsten, about 0.3% tungsten, about 0.4% tungsten, about 0.5% tungsten, about 0.6% tungsten, about 0.7% tungsten, about 0.8% tungsten, about 0.9% tungsten, or about 1.0% tungsten.

The alloys may comprise, by weight, 0% to about 1.0% tantalum, about 0.1% to about 1.0% tantalum, about 0.2% to about 1.0% tantalum, about 0.3% to about 1.0% tantalum, about 0.4% to about 1.0% tantalum, about 0.5% to about 1.0% tantalum, about 0.6% to about 1.0% tantalum, about 0.7% to about 1.0% tantalum, about 0.8% to about 1.0% tantalum, or about 0.9% to about 1.0% tantalum. The alloys may comprise, by weight, 0% to 1.0% tantalum, 0.1% to 1.0% tantalum, 0.2% to 1.0% tantalum, 0.3% to 1.0% tantalum, 0.4% to 1.0% tantalum, 0.5% to 1.0% tantalum, 0.6% to 1.0% tantalum, 0.7% to 1.0% tantalum, 0.8% to 1.0% tantalum, or 0.9% to 1.0% tantalum. The alloys may comprise, by weight, 0.1%, 0.2%, 0.3%, 0.4%, 0.5%, 0.6%, 0.7%, 0.8%, 0.9%, or 1.0% tantalum. The alloys may comprise, by weight, about 0.1% tantalum, about 0.2% tantalum, about 0.3% tantalum, about 0.4% tantalum, about 0.5% tantalum, about 0.6% tantalum, about 0.7% tantalum, about 0.8% tantalum, about 0.9% tantalum, or about 1.0% tantalum.

The alloys may comprise, by weight, 0% to about 1.0% hafnium, about 0.1% to about 1.0% hafnium, about 0.2% to about 1.0% hafnium, about 0.3% to about 1.0% hafnium, about 0.4% to about 1.0% hafnium, about 0.5% to about 1.0% hafnium, about 0.6% to about 1.0% hafnium, about 0.7% to about 1.0% hafnium, about 0.8% to about 1.0% hafnium, or about 0.9% to about 1.0% hafnium. The alloys may comprise, by weight, 0% to 1.0% hafnium, 0.1% to 1.0% hafnium, 0.2% to 1.0% hafnium, 0.3% to 1.0% hafnium, 0.4% to 1.0% hafnium, 0.5% to 1.0% hafnium, 0.6% to 1.0% hafnium, 0.7% to 1.0% hafnium, 0.8% to 1.0% hafnium, or 0.9% to 1.0% hafnium. The alloys may comprise, by weight, 0.1%, 0.2%, 0.3%, 0.4%, 0.5%, 0.6%, 0.7%, 0.8%, 0.9%, or 1.0% hafnium. The alloys may comprise, by weight, about 0.1% hafnium, about 0.2% hafnium, about 0.3% hafnium, about 0.4% hafnium, about 0.5% hafnium, about 0.6% hafnium, about 0.7% hafnium, about 0.8% hafnium, about 0.9% hafnium, or about 1.0% hafnium.

The alloys may comprise, by weight, 0% to about 1.0% ruthenium, about 0.1% to about 1.0% ruthenium, about 0.2% to about 1.0% ruthenium, about 0.3% to about 1.0% ruthenium, about 0.4% to about 1.0% ruthenium, about 0.5% to about 1.0% ruthenium, about 0.6% to about 1.0% ruthenium, about 0.7% to about 1.0% ruthenium, about 0.8% to about 1.0% ruthenium, or about 0.9% to about 1.0% ruthenium. The alloys may comprise, by weight, 0% to 1.0% ruthenium, 0.1% to 1.0% ruthenium, 0.2% to 1.0% ruthenium, 0.3% to 1.0% ruthenium, 0.4% to 1.0% ruthenium, 0.5% to 1.0% ruthenium, 0.6% to 1.0% ruthenium, 0.7% to 1.0% ruthenium, 0.8% to 1.0% ruthenium, or 0.9% to 1.0% ruthenium. The alloys may comprise, by weight, 0.1%, 0.2%, 0.3%, 0.4%, 0.5%, 0.6%, 0.7%, 0.8%, 0.9%, or 1.0% ruthenium. The alloys may comprise, by weight, about 0.1% ruthenium, about 0.2% ruthenium, about 0.3% ruthenium, about 0.4% ruthenium, about 0.5% ruthenium, about 0.6% ruthenium, about 0.7% ruthenium, about 0.8% ruthenium, about 0.9% ruthenium, or about 1.0% ruthenium.

The alloys may comprise, by weight, a balance of molybdenum and incidental elements and impurities. The term "incidental elements and impurities," may include one or more of iron, zirconium, hydrogen, nitrogen, and oxygen.

The incidental elements and impurities such as iron and zirconium may arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may comprise, by weight, 0.08% vanadium, 0.01% carbon, and 6.43% niobium, and the balance of weight comprising molybdenum and incidental elements and impurities such as iron and zirconium that would arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may comprise, by weight, 0.42% vanadium, 0.01% carbon, and 0.12% niobium, and the balance of weight comprising molybdenum and incidental elements and impurities such as iron and zirconium that would arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may comprise, by weight, 0.41% vanadium, 0.01% carbon, 0.54% niobium, 0.43% titanium, and 0.02% boron, and the balance of weight comprising molybdenum and incidental elements and impurities such as iron and zirconium that would arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may comprise, by weight, 0.32% vanadium, 0.01% carbon, 0.07% niobium, and 0.02% boron, and the balance of weight comprising molybdenum and incidental elements and impurities such as iron and zirconium that would arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may comprise, by weight, 0.09% vanadium, 0.01% carbon, 0.41% titanium, and 0.04% boron, and the balance of weight comprising molybdenum and incidental elements and impurities such as iron and zirconium that would arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may consist of, by weight, 0.08% vanadium, 0.01% carbon, and 6.43% niobium, and the balance of weight percent consisting of molybdenum and incidental elements and impurities such as iron and zirconium that would arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may consist of, by weight, 0.42% vanadium, 0.01% carbon, and 0.12% niobium, and the balance of weight percent consisting of molybdenum and incidental elements and impurities such as iron and zirconium that would arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may consist of, by weight, 0.41% vanadium, 0.01% carbon, 0.54% niobium, 0.43% titanium, and 0.02% boron, and the balance of weight percent consisting of molybdenum and incidental elements and impurities such as iron and zirconium that would arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may consist of, by weight, 0.32% vanadium, 0.01% carbon, 0.07% niobium, and 0.02% boron, and the balance of weight percent consisting of molybdenum and incidental elements and impurities such as iron and zirconium that would arise from the practice of using low-cost scrap material (e.g. Ferro-vanadium or recycled TZM, etc.). The incidental elements and impurities may include one or more of hydrogen (e.g., maximum 0.01%), nitrogen (e.g., maximum 0.01%), and oxygen (e.g., maximum 0.02%).

The alloys may consist of, by weight, 0.09% vanadium, 0.01% carbon, 0.41% titanium, and 0.04% boron, and the balance of weight percent consisting of molybdenum and incidental elements and impurities such as iron and zirconium that would arise from the practice of using low-cost scrap material (e.g. Ferro-vanadium or recycled TZM, etc.). The incidental elements and impurities may include one or more hydrogen (e.g., maximum 0.01%), nitrogen (e.g., maximum 0.01%), and oxygen (e.g., maximum 0.02%).

The alloys may comprise, by weight, less than 0.1% zirconium, less than 0.05% zirconium, less than 0.01% zirconium, or less than 0.001% zirconium. The alloys may be substantially free of zirconium (e.g., the alloys may have an amount of zirconium below the limits of detection). In certain embodiments, the alloys do not comprise zirconium.

The alloys may have a 0.2% offset yield strength, at 500° C., of 500 MPa to 1000 MPa, 515 MPa to 1000 MPa, 600 MPa to 1000 MPa, 607 MPa to 1000 MPa, 750 MPa to 1000 MPa, 758 MPa to 1000 MPa, 820 MPa to 1000 MPa, 823 MPa to 1000 MPa, 978 MPa to 1000 MPa, or 980 MPa to 1000 MPa. The alloys may have a 0.2% offset yield strength, at 500° C., of at least 500 MPa, at least 515 MPa, at least 550 MPa, at least 600 MPa, at least 607 MPa, at least 650 MPa, at least 700 MPa, at least 750 MPa, at least 758 MPa, at least 800 MPa, at least 820 MPa, at least 823 MPa, at least 850 MPa, at least 900 MPa, at least 950 MPa, at least 978 MPa, or at least 980 MPa. The alloys may have a 0.2% offset yield strength, at 500° C., of 500 MPa, 510 MPa, 515 MPa, 520 MPa, 530 MPa, 540 MPa, 550 MPa, 560 MPa, 570 MPa, 580 MPa, 590 MPa, 600 MPa, 601 MPa, 602 MPa, 603 MPa, 604 MPa, 605 MPa, 606 MPa, 607 MPa, 608 MPa, 609 MPa, 610 MPa, 620 MPa, 630 MPa, 640 MPa, 650 MPa, 660 MPa, 670 MPa, 680 MPa, 690 MPa, 700 MPa, 710 MPa, 720 MPa, 730 MPa, 740 MPa, 750 MPa, 751 MPa, 752 MPa, 753 MPa, 754 MPa, 755 MPa, 756 MPa, 757 MPa, 758 MPa, 759 MPa, 760 MPa, 770 MPa, 780 MPa, 790 MPa, 800 MPa, 810 MPa, 820 MPa, 821 MPa, 822 MPa, 823 MPa, 824 MPa, 825 MPa, 826 MPa, 827 MPa, 828 MPa, 829 MPa, 830 MPa, 840 MPa, 850 MPa, 860 MPa, 870 MPa, 880 MPa, 890 MPa, 900 MPa, 910 MPa, 920 MPa, 930 MPa, 940 MPa, 950 MPa, 960 MPa, 970 MPa, 971 MPa, 972 MPa, 973 MPa, 974 MPa, 975 MPa, 976 MPa, 977 MPa, 978 MPa, 979 MPa, 980 MPa, 990 MPa, or 1000 MPa. The alloys may have a 0.2% offset yield strength, at 500° C., of about 500 MPa, about 515 MPa, about 550 MPa, about 600 MPa, about 607 MPa, about 650 MPa, about 700 MPa, about 750 MPa, about 758 MPa, about 800 MPa, about 820 MPa, about 823 MPa, about 850 MPa, about 900 MPa, about 950 MPa, about 978 MPa, or about 980 MPa. The 0.2% offset yield strength may be measured according to ASTM E21.

The alloys may have a 0.2% offset yield strength, at 1000° C., of 300 MPa to 800 MPa, 320 MPa to 800 MPa, 324 MPa to 800 MPa, 447 MPa to 800 MPa, 450 MPa to 800 MPa, 559 MPa to 800 MPa, 570 MPa to 800 MPa, 654 MPa to 800 MPa, 670 MPa to 800 MPa, 756 MPa to 800 MPa, or 770 MPa to 800 MPa. The alloys may have a 0.2% offset yield strength, at 1000° C., of at least 300 MPa, at least 320 MPa, at least 324 MPa, at least 350 MPa, at least 400 MPa, at least 447 MPa, at least 450 MPa, at least 500 MPa, at least 550 MPa, at least 559 MPa, at least 570 MPa, at least 600 MPa, at least 650 MPa, at least 654 MPa, at least 700 MPa, at least 750 MPa, at least 756 MPa, or at least 770 MPa. The alloys may have a 0.2% offset yield strength, at 1000° C., of 300 MPa, 310 MPa, 320 MPa, 321 MPa, 322 MPa, 323 MPa, 324 MPa, 325 MPa, 326 MPa, 327 MPa, 328 MPa, 329 MPa, 330 MPa, 340 MPa, 350 MPa, 360 MPa, 370 MPa, 380 MPa, 390 MPa, 400 MPa, 410 MPa, 420 MPa, 430 MPa, 440 MPa, 441 MPa, 442 MPa, 443 MPa, 444 MPa, 445 MPa, 446 MPa, 447 MPa, 448 MPa, 449 MPa, 450 MPa, 460 MPa, 470 MPa, 480 MPa, 490 MPa, 500 MPa, 510 MPa, 520 MPa, 530 MPa, 540 MPa, 550 MPa, 551 MPa, 552 MPa, 553 MPa, 554 MPa, 555 MPa, 556 MPa, 557 MPa, 558 MPa, 559 MPa, 560 MPa, 570 MPa, 580 MPa, 590 MPa, 600 MPa, 610 MPa, 620 MPa, 630 MPa, 640 MPa, 650 MPa, 651 MPa, 652 MPa, 653 MPa, 654 MPa, 655 MPa, 656 MPa, 657 MPa, 658 MPa, 659 MPa, 660 MPa, 670 MPa, 680 MPa, 690 MPa, 700 MPa, 710 MPa, 720 MPa, 730 MPa, 740 MPa, 750 MPa, 751 MPa, 752 MPa, 753 MPa, 754 MPa, 755 MPa, 756 MPa, 757 MPa, 758 MPa, 759 MPa, 760 MPa, 770 MPa, 780 MPa, 790 MPa, or 800 MPa. The alloys may have a 0.2% offset yield strength, at 1000° C., of about 300 MPa, about 320 MPa, about 324 MPa, about 350 MPa, about 400 MPa, about 447 MPa, about 450 MPa, about 500 MPa, about 550 MPa, about 559 MPa, about 570 MPa, about 600 MPa, about 650 MPa, about 654 MPa, about 670 MPa, about 700 MPa, about 750 MPa, about 756 MPa, or about 770 MPa. The 0.2% offset yield strength may be measured according to ASTM E21.

The alloys may have a tensile reduction in area, at 500° C., of 25% to 80%, 30% to 70%, 45% to 70%, 45% to 80%, 49% to 70%, 62% to 70%, 68% to 70%, or 68% to 80%. The alloys may have a tensile reduction in area, at 500° C., of at least 25%, at least 30%, at least 35%, at least 40%, at least 45%, at least 49%, at least 50%, at least 55%, at least 60%, at least 62%, at least 65%, at least 68%, at least 70%, or at least 80%. The alloys may have a tensile reduction in area, at 500° C., of 25%, 26%, 27%, 28%, 29%, 30%, 31%, 32%, 33%, 34%, 35%, 36%, 37%, 38%, 39%, 40%, 41%, 42%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, or 80%. The alloys may have a tensile reduction in area, at 500° C., of about 30%, about 35%, about 40%, about 45%, about 49%, about 50%, about 55%, about 60%, about 62%, about 65%, or about 68%. The tensile reduction in area may be measured according to ASTM E21.

The alloys may have a tensile reduction in area, at 1000° C., of 55% to 75%, 59% to 75%, of 64% to 75%, 69% to 75%, 70% to 75%, or 71% to 75%. The alloys may have a tensile reduction in area, at 1000° C., of at least 55%, at least 59%, at least 60%, at least 64%, at least 65%, at least 69%, at least 70%, at least 71%, or at least 75%. The alloys may have a tensile reduction in area, at 1000° C., of 55%, 56%, 57%, 58%, 59%, 60%, 61%, 62%, 63%, 64%, 65%, 66%, 67%, 68%, 69%, 70%, 71%, 72%, 73%, 74%, or 75%. The alloys may have a tensile reduction in area, at 1000° C., of about 55%, about 59%, about 60%, about 64%, about 65%, about 69%, about 70%, or about 71%. The tensile reduction in area may be measured according to ASTM E21.

The alloys may have a recrystallization temperature of 1150° C. to 1350° C., 1175° C. to 1350° C., 1225° C. to 1350° C., or 1325° C. to 1350° C. The alloys may have a recrystallization temperature of at least 1150° C., at least 1175° C., at least 1200° C., at least 1250° C., at least 1275° C., at least 1300° C., at least 1325° C., or at least 1350° C. The alloys may have a recrystallization temperature of 1150° C., 1160° C., 1170° C., 1175° C., 1180° C., 1190° C., 1200° C., 1210° C., 1220° C., 1225° C., 1230° C., 1240° C., 1250° C., 1260° C., 1270° C., 1275° C., 1280° C., 1290° C., 1300° C., 1310° C., 1320° C., 1325° C., 1330° C., 1340° C., or 1350° C. The alloys may have a recrystallization temperature of about 1175° C., about 1200° C., about 1250° C., about 1275° C., about 1300° C., or about 1325° C.

The alloys may have a ductile to brittle transition temperature of −100° C. to 300° C., −85° C. to 300° C., −85° C. to 0° C., −85° C. to −40° C., or −85° C. to −50° C. The alloys may have a ductile to brittle transition temperature of 300° C. or less, 200° C. or less, 100° C. or less, 50° C. or less, 0° C. or less, −40° C. or less, −50° C. or less, or −85° C. or less. The alloys may have a ductile to brittle transition temperature of −100° C., −90° C., −85° C., −80° C., −75° C., −70° C., −65° C., −60° C., −65° C., −60° C., −55° C., −50° C., −45° C., −40° C., −35° C., −30° C., −25° C., −20° C., −15° C., −10° C., −5° C., 0° C., 10° C., 20° C., 30° C., 40° C., 50° C., 100° C., 150° C., 200° C., 250° C., or 300° C. The alloys may have a ductile to brittle transition temperature of about −85° C., about −50° C., about −40° C., about 0° C., about 200° C., or about 300° C. The ductile to brittle transition temperature may be measured according to the procedure of Cockeram B. V. Metal Mater. Trans. 33A (2002) 3685.

The alloys may have a grain pinning dispersion of MC, $M_2C$, MB, $M_3B_2$, $M_2B$, or $B_2M$ particles, or a combination thereof. The MC, $M_2C$, MB, $M_3B_2$, $M_2B$, or $B_2M$ particles may include niobium, vanadium, titanium, tungsten, tantalum, hathium, ruthenium, or molybdenum. For example, M, at each occurrence, may be independently selected from the group consisting of niobium, vanadium, titanium, tungsten, tantalum, hathium, ruthenium, and molybdenum. Exemplary grain pinning particles include, but are not limited to, NbC, $Nb_2C$, NbB, $Nb_3B_2$, $Nb_2B$, $B_2Nb$, VC, $V_2C$, VB, $V_3B_2$, $V_2B$, $B_2V$, TiC, $Ti_2C$, TiB, $Ti_3B_2$, $Ti_2B$, $B_2Ti$, WC, $W_2C$, WB, $W_3B_2$, $W_2B$, $B_2W$, TaC, $Ta_2C$, TaB, $Ta_3B_2$, $Ta_2B$, $B_2Ta$, HfC, $Hf_2C$, HfB, $Hf_3B_2$, $Hf_2B$, $B_2Hf$, RuC, $Ru_2C$, RuB, $Ru_3B_2$, $Ru_2B$, $B_2Ru$, MoC, $Mo_2C$, MoB, $Mo_3B_2$, $Mo_2B$, and $B_2Mo$. The alloys may have a grain pinning dispersion comprising any of the aforementioned particles, or any combination thereof.

The alloys may have an average grain width of 10 to 70 microns, 10 to 60 microns, 20 to 60 microns, 20 to 55 microns, 20 to 50 microns, 20 to 40 microns, 20 to 38 microns, 38 to 70 microns, 38 to 60 microns, 40 to 70 microns, 45 to 70 microns, 50 to 70 microns, 50 to 60 microns, or 50 to 55 microns. The alloys may have an average grain width of about 10 to about 70 microns, about 10 to about 60 microns, about 20 to about 60 microns, about 20 to about 55 microns, about 20 to about 50 microns, about 20 to about 40 microns, about 20 to about 38 microns, about 38 to about 70 microns, about 38 to about 60 microns, about 40 to about 70 microns, about 45 to about 70 microns, about 50 to about 70 microns, about 50 to about 60 microns, or about 50 to about 55 microns. The alloys may have an average grain width of about 10 microns, 11 microns, 12 microns, 13 microns, 14 microns, 15 microns, 16 microns, 17 microns, 18 microns, 19 microns, 20 microns, 21 microns, 22 microns, 23 microns, 24 microns, 25 microns, 26 microns, 27 microns, 28 microns, 29 microns, 30 microns, 31 microns, 32 microns, 33 microns, 34 microns, 35 microns, 36 microns, 37 microns, 38 microns, 39 microns, 40 microns, 41 microns, 42 microns, 43 microns, 44 microns, 45 microns, 46 microns, 47 microns, 48 microns, 49 microns, 50 microns, 51 microns, 52 microns, 53 microns, 54 microns, 55 microns, 56 microns, 57 microns, 58 microns, 59 microns, 60 microns, 61 microns, 62 microns, 63 microns, 64 microns, 65 microns, 66 microns, 67 microns, 68 microns, 69 microns, or 70 microns. The alloys may have an average grain width of about 20 microns, about 38 microns, about 50 microns, or about 55 microns. The average grain width may be measured according to ASTM E112.

III. Methods of Producing Alloys

The alloys may be produced via double alternating current consumable electrode vacuum melting as 10 pound, 2.5 inch diameter by 6 inch long ingots. Ingots may be extruded at 1350° C. into 1 inch by 0.4 inch bars, and hot rolled at 1200° C. into plates of specified thickness for testing desired properties.

IV. Articles of Manufacture

Also disclosed are manufactured articles including the disclosed alloys. Exemplary manufactured articles include, but are not limited to, rocket thrusters, rocket engine nozzles, and turbine engines.

V. Examples

Molybdenum alloys were prepared and tested for physical properties. A counter-example (TZM) was also prepared and tested for comparison. Table 1 shows the design and composition of the exemplified alloys (Alloys A-E).

TABLE 1

Composition weight percentages of raw alloys

| | Metal | V* | Nb* | Ti* | Zr* | C** | B** | Mo |
|---|---|---|---|---|---|---|---|---|
| TZM | Design Target (%) | — | — | 0.50 | 0.09 | 0.02 | — | balance |
| | Measured (%) | — | — | 0.35 | 0.097 | 0.02 | — | balance |
| Alloy A | Design Target (%) | 0.50 | 0.10 | — | — | 0.02 | — | balance |
| | Measured (%) | 0.42 | 0.12 | — | — | 0.015 | — | balance |
| Alloy B | Design Target (%) | 0.50 | 0.50 | 0.50 | — | 0.02 | 0.01 | balance |
| | Measured (%) | 0.41 | 0.54 | 0.43 | — | 0.014 | 0.024 | balance |
| Alloy C | Design Target (%) | 0.10 | 8.00 | — | — | 0.02 | — | balance |
| | Measured (%) | 0.077 | 6.43 | — | — | 0.011 | — | balance |
| Alloy D | Design Target (%) | 0.53 | 0.11 | — | — | 0.01 | 0.024 | balance |
| | Measured (%) | 0.32 | 0.071 | — | — | 0.012 | 0.024 | balance |
| Alloy E | Design Target (%) | 0.10 | — | 0.50 | — | 0.01 | 0.02 | balance |
| | Measured (%) | 0.088 | — | 0.41 | — | 0.015 | 0.036 | balance |

*Wt % determined by ICP-OES;
**Wt % determined by Leco-IGA

Example 1: Alloy A

A melt was prepared with the nominal composition of 0.42 V, 0.12 Nb, 0.015 C, and balance Mo, in wt %. The alloy was produced via double alternating current consumable electrode vacuum melting as 10 pound, 2.5" diameter by 6" long ingots. Ingots were extruded at 1350° C. into 1" by 0.4" bar, and hot rolled at 1200° C. into a 0.15" thick plate for tensile testing and a 0.04" thick plate for three-point bend testing. All testing was completed in the as-hot rolled condition.

Example 2: Alloy B

A melt was prepared with the nominal composition of 0.41 V, 0.54 Nb, 0.43 Ti, 0.014 C, 0.024 B, and balance Mo, in wt %. The alloy was produced via double alternating current consumable electrode vacuum melting as 10 pound, 2.5" diameter by 6" long ingots. Ingots were extruded at 1350° C. into 1" by 0.4" bar, and hot rolled at 1200° C. into a 0.15" thick plate for tensile testing and a 0.04" thick plate for three-point bend testing. All testing was completed in the as-hot rolled condition.

Example 3: Alloy C

A melt was prepared with the nominal composition of 0.077 V, 6.43 Nb, 0.011 C, and balance Mo, in wt %. The alloy was produced via double alternating current consumable electrode vacuum melting as 10 pound, 2.5" diameter by 6" long ingots. Ingots were extruded at 1350° C. into 1" by 0.4" bar, and hot rolled at 1200° C. into a 0.15" thick plate for tensile testing and a 0.04" thick plate for three-point bend testing. All testing was completed in the as-hot rolled condition.

Example 4: Alloy D

A melt was prepared with the nominal composition of 0.32 V, 0.071 Nb, 0.012 C, 0.024 B, and balance Mo, in wt %. The alloy was produced via double alternating current consumable electrode vacuum melting as 10 pound, 2.5" diameter by 6" long ingots. Ingots were extruded at 1350° C. into 1" by 0.4" bar, and hot rolled at 1200° C. into a 0.15" thick plate for tensile testing and a 0.04" thick plate for three-point bend testing. All testing was completed in the as-hot rolled condition.

Example 5: Alloy E

A melt was prepared with the nominal composition of 0.088 V, 0.41 Ti, 0.015 C, 0.036 B, and balance Mo, in wt %. The alloy was produced via double alternating current consumable electrode vacuum melting as 10 pound, 2.5" diameter by 6" long ingots. Ingots were extruded at 1350° C. into 1" by 0.4" bar, and hot rolled at 1200° C. into a 0.15" thick plate for tensile testing and a 0.04" thick plate for three-point bend testing. All testing was completed in the as-hot rolled condition.

Comparative Example 6: TZM

A melt was prepared with the nominal composition of 0.35 Ti, 0.097 Zr, 0.02 C, and balance Mo, in wt %. The alloy was produced via double alternating current consumable electrode vacuum melting as 10 pound, 2.5" diameter by 6" long ingots. Ingots were extruded at 1350° C. into 1" by 0.4" bar, and hot rolled at 1200° C. into a 0.15" thick plate for tensile testing and a 0.04" thick plate for three-point bend testing. All testing was completed in the as-hot rolled condition.

A. Physical Testing of Alloys 10 lb ingots of each alloy were fabricated for preparation of test specimens, as described above. The alloys were each double vacuum melted (AC consumable electrode melting) into 2.5-inch round×6-inch long ingots. After extrusion at 1350° C. into 1-inch×0.4-inch bars, the alloys were rolled into plates. Test specimens were excised from the hot-rolled plates.

Three-point bend tests were conducted on the test specimens to determine the Ductile to Brittle Transition Temperature (DBTT) of each alloy. DBTT was determined by a three-point bend test method as utilized in literature, such as that described in Cockeram B. V. Metal Mater. Trans. 33A (2002) 3685. The plate specimens were tested at a series of temperatures. Test specimens are considered "ductile" if a 90° bend of the test plate can be achieved without cracking. FIG. 1 and Table 2 illustrate the results of these tests. Alloys A, B, D, and E demonstrated superior DBTT to that of TZM.

Figure 2:
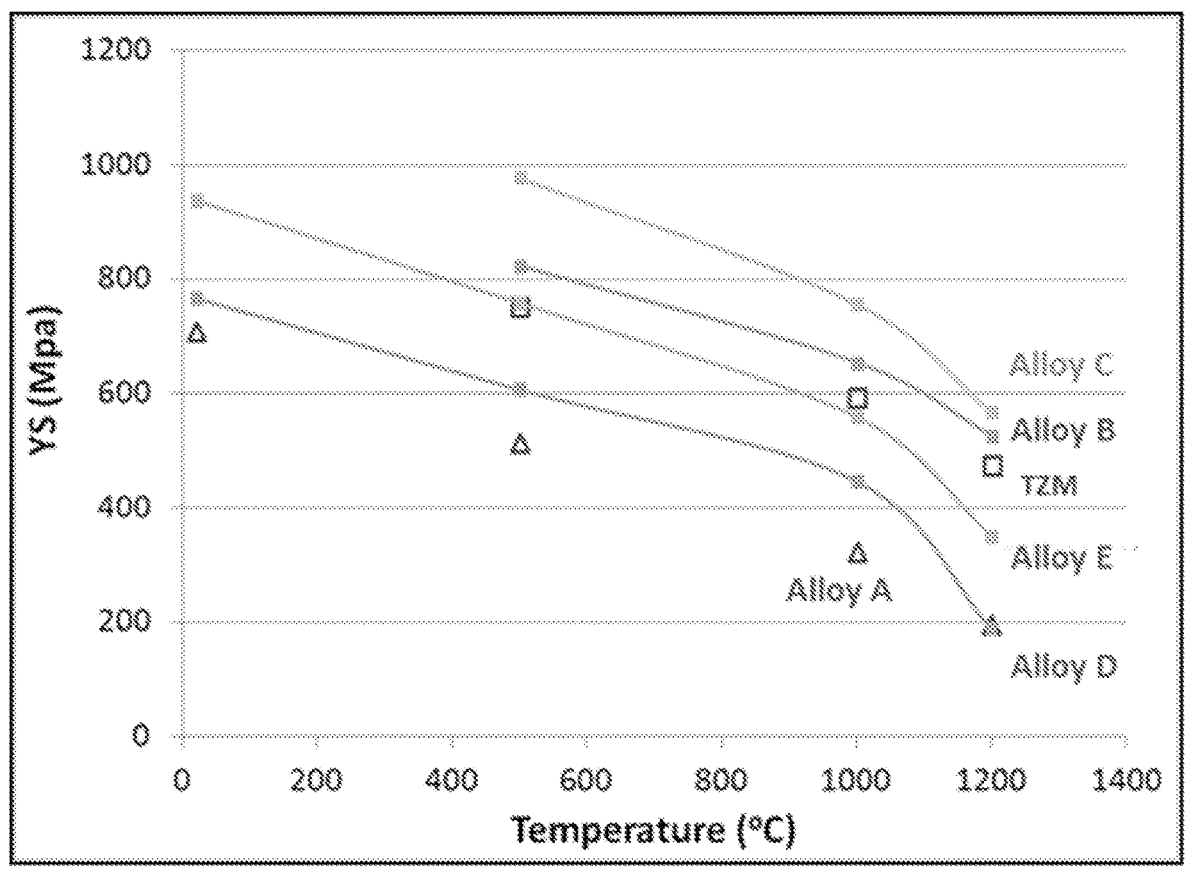
FIG. 2 is a graph depicting the 0.2% offset tensile yield strength vs. temperature relationship for exemplary molybdenum-based alloys in comparison to the commercial alloy TZM.

Tensile yield strength was also determined for each of the alloys at a series of temperatures in accordance with ASTM E21. FIG. 2 illustrates that the Alloys B, C, and E showed similar or superior tensile yield strength to the tensile yield strength of TZM.

Figure 3:
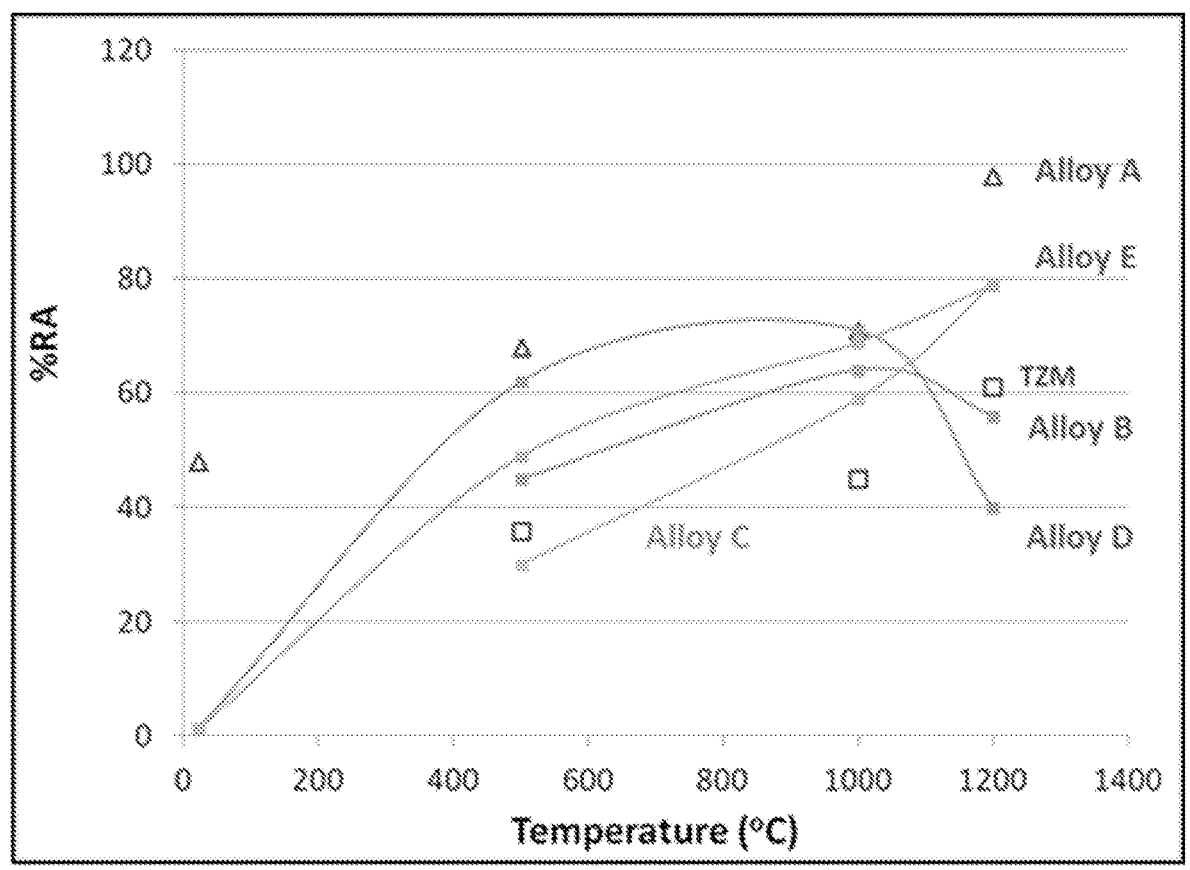
FIG. 3 is a graph depicting the % tensile reduction in area vs. temperature relationship for exemplary molybdenum-based alloys in comparison to the commercial alloy TZM.

Determination of the tensile reduction in area for each of the alloys at these temperatures was also achieved in accordance with ASTM E21. FIG. 3 illustrates that Alloys A, B, D, and E demonstrated superior ductility over TZM at temperatures up to 1000° C.

Figure 4:
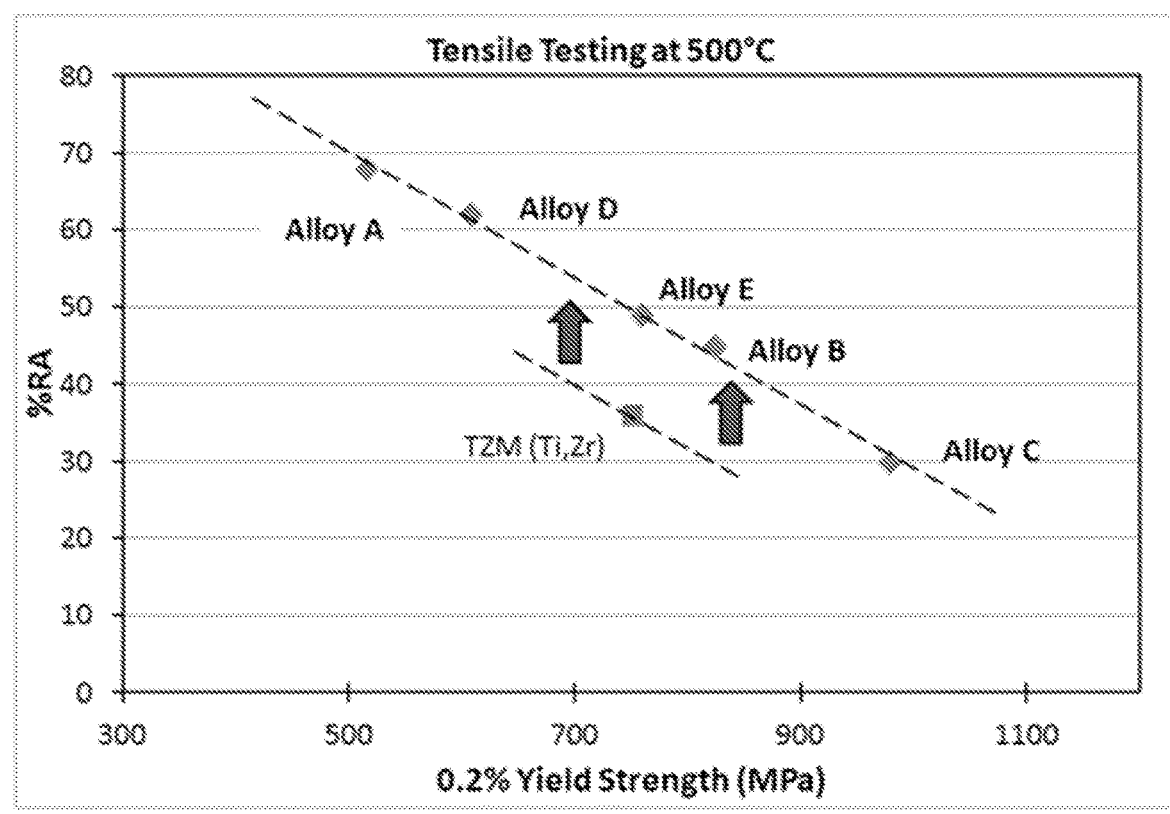
FIG. 4 is a graph depicting % tensile reduction in area vs. 0.2% offset tensile yield strength at 500° C. for exemplary molybdenum-based alloys in comparison to the commercial alloy TZM.
Figure 5:
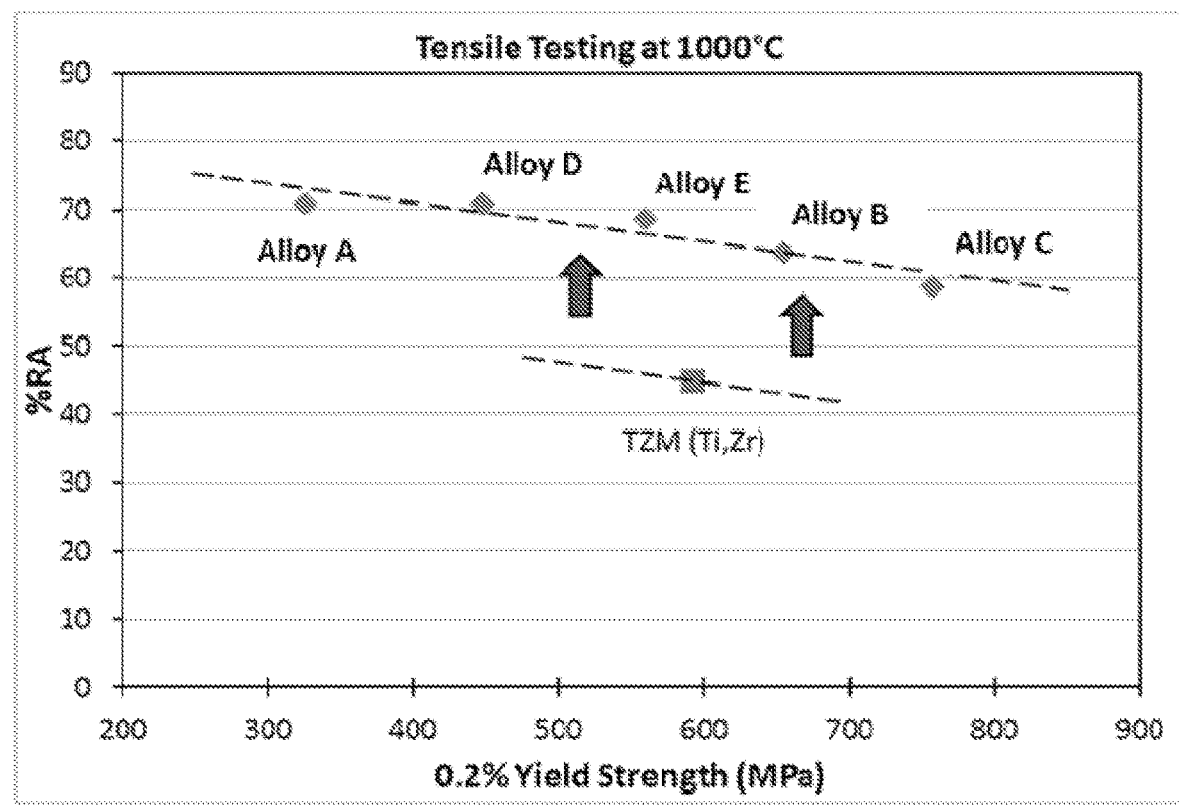
FIG. 5 is a graph depicting % tensile reduction in area vs. 0.2% offset tensile yield strength at 1000° C. for exemplary molybdenum-based alloys in comparison to the commercial alloy TZM.

FIGS. 4 and 5 illustrate cross-plots of the tensile yield strength vs. the tensile reduction in area for each of the alloys at 500° C. (FIG. 3) and 1000° C. (FIG. 4). These cross-plots serve to demonstrate that Alloys A-E displayed a consistent trend of increased ductility over a range of achievable strength.

Figure 6:
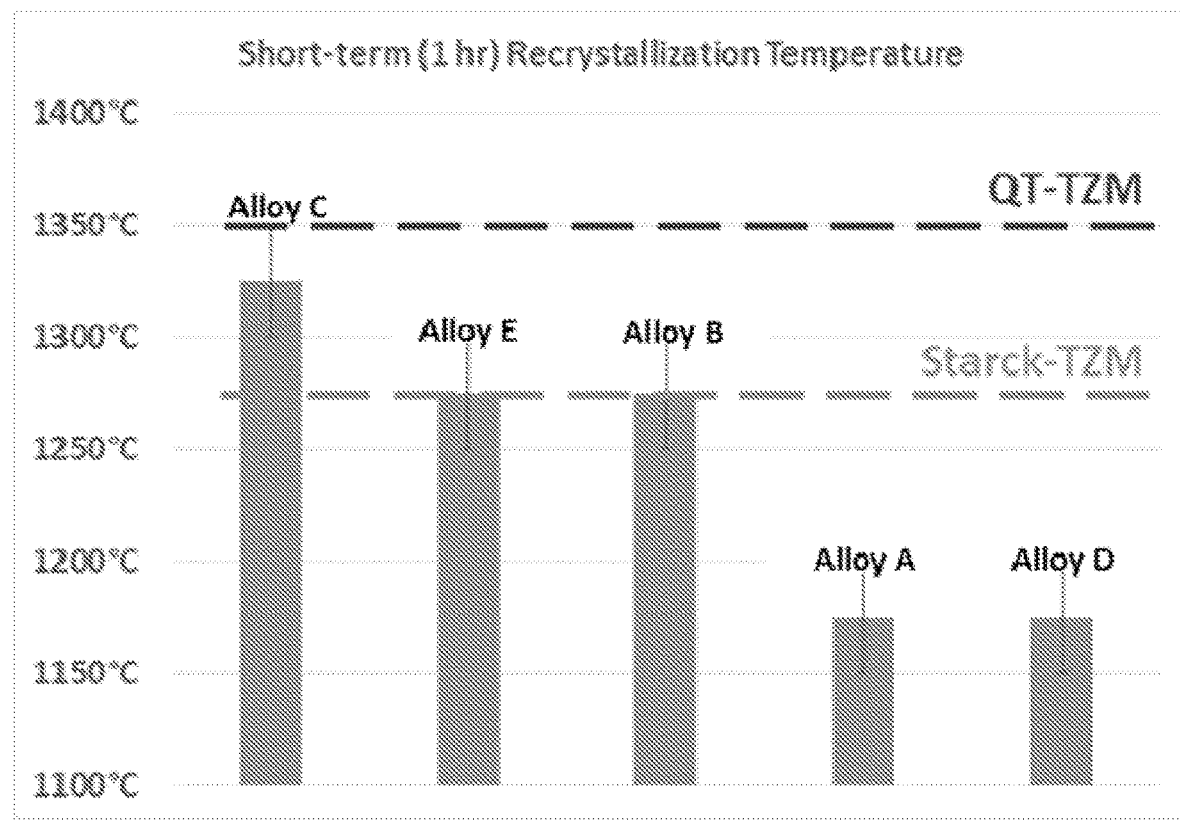
FIG. 6 is a chart illustrating the recrystallization temperatures for exemplary molybdenum-based alloys in comparison to the commercial alloy TZM. QT-TZM is TZM produced in the laboratory, while Starck-TZM is TZM purchased commercially.

The recrystallization temperature at which 100% recrystallization occurs within 1 hour was also determined for each of the alloys. FIG. 6 shows the recrystallization temperature of Alloys A-E in comparison to the recrystallization temperature of TZM produced in the laboratory and TZM purchased commercially (from H. C. Starck). Alloys A, D, and E displayed equivalent or higher recrystallization temperature than the commercially purchased TZM.

As seen in Table 2 and FIGS. 1-6, the disclosed alloys have physical properties that are comparable or superior to those of TZM.

TABLE 2

| | DBTT (° C.) | 0.2% Offset Tensile Yield Strength at 500° C. (MPa) | 0.2% Offset Tensile Yield Strength at 1000° C. (MPa) | % RA at 500° C. | % RA at 1000° C. | Recrystallization Temperature (° C.) |
|---|---|---|---|---|---|---|
| Alloy A | −85 | 515 | 324 | 68 | 71 | 1175 |
| Alloy B | 0 | 823 | 654 | 45 | 64 | 1275 |
| Alloy C | 200-300 | 978 | 756 | 30 | 59 | 1325 |
| Alloy D | −40 | 607 | 447 | 62 | 71 | 1175 |
| Alloy E | −50 | 758 | 559 | 49 | 69 | 1275 |
| QT-TZM | 10 | 751 | 592 | 36 | 45 | 1350 |
| Starck-TZM | — | — | — | — | — | 1275 |

DBTT = ductile to brittle transition temperature;
% RA = percent tensile reduction in area Measurements of grain size were made as the mean linear intercept length in the short-transverse direction of the rolled plate material. Grains were heavily elongated in the rolling direction, and flattened in the short-transverse direction, so this measurement represents the minor dimension of the grains. Measurements were made in accordance with ASTM E112 standards. Table 3 shows the results of these measurements for Alloys A-E in comparison to TZM.

TABLE 3

| Alloy | Average Linear Intercept (microns) |
| --- | --- |
| Alloy A | 20 |
| Alloy B | 50 |
| Alloy C | 55 |
| Alloy D | 50 |
| Alloy E | 38 |
| TZM | 40 |

It is understood that the disclosure may embody other specific forms without departing from the spirit or central characteristics thereof. The disclosure of aspects and embodiments, therefore, are to be considered in all respects as illustrative and not restrictive, and the claims are not to be limited to the details given herein. Accordingly, while specific embodiments have been illustrated and described, numerous modifications come to mind without significantly departing from the spirit of the invention and the scope of protection is only limited by the scope of the accompanying claims. Unless noted otherwise, all percentages listed herein are weight percentages.

For reasons of completeness, various aspects of the present disclosure are set out in the following numbered clauses:

Clause 1. An alloy comprising, by weight, about 0.01% to about 1% vanadium, 0% to about 0.04% carbon, 0% to about 8% niobium, 0% to about 1% titanium, 0% to about 0.04% boron, 0% to about 1% tungsten, 0% to about 1% tantalum, 0% to about 1% hafnium, and 0% to about 1% ruthenium, the balance essentially molybdenum and incidental elements and impurities.

Clause 2. The alloy of clause 1, wherein the alloy comprises by weight, about 0.01% to about 1% vanadium, about 0.01% to about 0.02% carbon, 0% to about 8.0% niobium, 0% to about 1% titanium, and 0% to about 0.04% boron, the balance essentially molybdenum and incidental elements and impurities.

Clause 3. The alloy of clause 1, wherein the alloy comprises, by weight, about 0.05% to about 0.55% vanadium, about 0.01% to about 0.02% carbon, 0% to about 8.0% niobium, 0% to about 0.5% titanium, and 0% to about 0.04% boron, the balance essentially molybdenum and incidental elements and impurities.

Clause 4. The alloy of any of clauses 1-3, wherein the alloy does not comprise zirconium.

Clause 5. The alloy of any of clauses 1-4, wherein the alloy has a 0.2% offset tensile yield strength of greater than 300 Mpa at 1000° C., measured according to ASTM E21.

Clause 6. The alloy of any of clauses 1-4, wherein the alloy has a 0.2% offset tensile yield strength of greater than 500 Mpa at 500° C., measured according to ASTM E21.

Clause 7. The alloy of any of clauses 1-4, wherein the alloy has a tensile reduction in area of greater than 55% at 1000° C., measured according to ASTM E21.

Clause 8. The alloy of any of clauses 1-4, wherein the alloy has a tensile reduction in area of greater than 25% at 500° C., measured according to ASTM E21.

Clause 9. The alloy of any of clauses 1-4, wherein the alloy has a recrystallization temperature of greater than 1150° C.

Clause 10. The alloy of any of clauses 1-4, wherein the alloy has a ductile to brittle transition temperature (DBTT) of 300° C. or less.

Clause 11. The alloy of any of clauses 1-4, wherein the alloy comprises a grain pinning dispersion of MC, $M_2C$, MB, $M_3B_2$, $M_2B$, or $B_2M$ particles, or a combination thereof.

Clause 12. The alloy of clause 11, wherein M, at each occurrence, is independently selected from the group consisting of niobium, vanadium, titanium, tungsten, tantalum, hathium, ruthenium, and molybdenum.

Clause 13. The alloy of any of clauses 1-4, wherein niobium, vanadium, ruthenium, boron, and carbon atoms, or a combination thereof, enhance grain boundary cohesion.

Clause 14. The alloy of any of clauses 1-4, wherein the average grain width of the alloy is 15 to 60 microns.

Clause 15. The alloy of any of clauses 1-4, wherein the alloy comprises about 0.08% vanadium, about 0.01% carbon, and about 6.43% niobium.

Clause 16. The alloy of any of clauses 1-4, wherein the alloy comprises 0% to about 0.54% niobium.

Clause 17. The alloy of clause 16, wherein the alloy has a ductile to brittle transition temperature (DBTT) of 0° C. or less.

Clause 18. The alloy of any of clauses 1-4, wherein the alloy comprises about 0.42% vanadium, about 0.01% carbon, and about 0.01% niobium.

Clause 19. The alloy of any of clauses 1-4, wherein the alloy comprises about 0.41% vanadium, about 0.01% carbon, about 0.54% niobium, about 0.43% titanium, and about 0.02% boron.

Clause 20. The alloy of any of clauses 1-4, wherein the alloy comprises about 0.32% vanadium, about 0.01% carbon, about 0.07% niobium, and about 0.02% boron.

Clause 21. The alloy of any of clauses 1-4, wherein the alloy comprises about 0.09% vanadium, about 0.01% carbon, about 0.41% titanium, and about 0.04% boron.

Clause 22. A method for producing an alloy, comprising:
preparing a melt that includes, by weight, 0.01% to about 1% vanadium, 0% to about 0.04% carbon, 0% to about 8% niobium, 0% to about 1% titanium, 0% to about 0.04% boron, 0% to about 1% tungsten, 0% to about 1% tantalum, 0% to about 1% hafnium, and 0% to about 1% ruthenium, the balance essentially molybdenum and incidental elements and impurities.

Clause 23. The method of clause 22, wherein the alloy comprises by weight, about 0.01% to about 1% vanadium, about 0.01% to about 0.02% carbon, 0% to about 8.0% niobium, 0% to about 1% titanium, and 0% to about 0.04% boron, the balance essentially molybdenum and incidental elements and impurities.

Clause 24. The method of clause 22, wherein the alloy comprises, by weight, about 0.05% to about 0.55% vanadium, about 0.01% to about 0.02% carbon, 0% to about 8.0% niobium, 0% to about 0.5% titanium, and 0% to about 0.04% boron, the balance essentially molybdenum and incidental elements and impurities.

Clause 25. The method of clause 22, wherein the melt is produced via double alternating current consumable electrode vacuum melting as ingots with specified dimensions.

Clause 26. The method of clause 25, further comprising extruding the ingots into shapes of specified dimensions.

Clause 27. The method of clause 26, wherein the ingots are extruded at 1350° C.

Clause 28. The method of clause 22, wherein the alloy has a 0.2% offset tensile yield strength of greater than 300 Mpa at 1000° C., measured according to ASTM E21.

Clause 29. The method of clause 22, wherein the alloy has a 0.2% offset tensile yield strength of greater than 500 Mpa at 500° C., measured according to ASTM E21.

Clause 30. The method of clause 22, wherein the alloy has a tensile reduction in area of greater than 55% at 1000° C., measured according to ASTM E21.

Clause 31. The method of clause 22, wherein the alloy has a tensile reduction in area of greater than 25% at 500° C., measured according to ASTM E21.

Clause 32. The method of clause 22, wherein the alloy has a recrystallization temperature of greater than 1150° C.

Clause 33. The method of clause 22, wherein the alloy has a ductile to brittle transition temperature (DBTT) of 300° C. or less.

Clause 34. The method of clause 22, wherein the alloy comprises a grain pinning dispersion of MC, $M_2C$, MB, $M_3B_2$, $M_2B$, or $B_2M$ particles, or a combination thereof; wherein M, at each occurrence, is independently selected from the group consisting of niobium, vanadium, titanium, tungsten, tantalum, hafnium, ruthenium, and molybdenum.

Clause 35. The method of clause 22, wherein niobium, vanadium, ruthenium, boron, and carbon atoms, or a combination thereof, enhance grain boundary cohesion.

Clause 36. The method of clause 22, wherein the average grain width of the alloy is 15 to 60 microns.

Clause 37. The method of clause 22, wherein the alloy comprises 0% to about 0.54% niobium.

Clause 38. The method of clause 37, wherein said alloy has a ductile to brittle transition temperature (DBTT) of 0° C. or less.

Clause 39. A manufactured article comprising an alloy that includes, by weight, 0.01% to about 1% vanadium, 0% to about 0.04% carbon, 0% to about 8% niobium, 0% to about 1% titanium, 0% to about 0.04% boron, 0% to about 1% tungsten, 0% to about 1% tantalum, 0% to about 1% hafnium, and 0% to about 1% ruthenium, the balance essentially molybdenum and incidental elements and impurities.

Clause 40. The article of clause 39, wherein the alloy comprises by weight, about 0.01% to about 1% vanadium, about 0.01% to about 0.02% carbon, 0% to about 8.0% niobium, 0% to about 1% titanium, and 0% to about 0.04% boron, the balance essentially molybdenum and incidental elements and impurities.

Clause 41. The article of clause 39, wherein the alloy comprises, by weight, about 0.05% to about 0.55% vanadium, about 0.01% to about 0.02% carbon, 0% to about 8.0% niobium, 0% to about 0.5% titanium, and 0% to about 0.04% boron, the balance essentially molybdenum and incidental elements and impurities.

Clause 42. The article of clause 39, wherein the alloy has a 0.2% offset tensile yield strength of greater than 300 Mpa at 1000° C., measured according to ASTM E21.

Clause 43. The article of clause 39, wherein the alloy has a 0.2% offset tensile yield strength of greater than 500 Mpa at 500° C., measured according to ASTM E21.

Clause 44. The article of clause 39, wherein the alloy has a tensile reduction in area of greater than 55% at 1000° C., measured according to ASTM E21.

Clause 45. The article of clause 39, wherein the alloy has a tensile reduction in area of greater than 25% at 500° C., measured according to ASTM E21.

Clause 46. The article of clause 39, wherein the alloy has a recrystallization temperature of greater than 1150° C.

Clause 47. The article of clause 39, wherein the alloy has a ductile to brittle transition temperature (DBTT) of 300° C. or less.

Clause 48. The article of clause 39, wherein the alloy comprises a grain pinning dispersion of MC, $M_2C$, MB, $M_3B_2$, $M_2B$, or $B_2M$ particles, or a combination thereof; wherein M, at each occurrence, is independently selected from the group consisting of niobium, vanadium, titanium, tungsten, tantalum, hafnium, ruthenium, and molybdenum.

Clause 49. The article of clause 39, wherein niobium, vanadium, boron, ruthenium, and carbon atoms, or a combination thereof, enhance grain boundary cohesion.

Clause 50. The article of clause 39, wherein the average grain width of the alloy is 15 to 60 microns.

Clause 51. The article of clause 39, wherein the alloy comprises 0% to about 0.54% niobium.

Clause 52. The article of clause 51, wherein the alloy has a ductile to brittle transition temperature (DBTT) of 0° C. or less.

Clause 53. The article of clauses 37 or 52, wherein the article is at least one of a rocket thruster, a rocket engine nozzle, or a turbine engine.

What is claimed is:

1. An alloy comprising, by weight:
   0.01% to 1% vanadium,
   0% to 0.04% carbon,
   0.01% to 6.5% niobium,
   0% to 1% titanium,
   about 0.024% to 0.04% boron,
   0% to 1% tungsten,
   0% to 1% tantalum,
   0% to 1% hafnium, and
   0% to 1% ruthenium,
   the balance molybdenum and incidental elements and impurities.

2. The alloy of claim 1, The alloy of claim 1, wherein the alloy comprises, by weight, 0.05% to 0.55% vanadium, 0.01% to 0.02% carbon, 0.01% to 6.5% niobium, and 0% to 0.5% titanium, the balance molybdenum and incidental elements and impurities.

3. The alloy of claim 1, wherein the alloy has a 0.2% offset tensile yield strength of greater than 300 Mpa at 1000° C., measured according to ASTM E21.

4. The alloy of claim 1, wherein the alloy has a 0.2% offset tensile yield strength of greater than 500 Mpa at 500° C., measured according to ASTM E21.

5. The alloy of claim 1, wherein the alloy has a tensile reduction in area of greater than 55% at 1000° C., measured according to ASTM E21.

6. The alloy of claim 1, wherein the alloy has a tensile reduction in area of greater than 25% at 500° C., measured according to ASTM E21.

7. The alloy of claim 1, wherein the alloy has a recrystallization temperature of greater than 1150° C.

8. The alloy of claim 1, wherein the alloy has a ductile to brittle transition temperature (DBTT) of 300° C. or less.

9. The alloy of claim 1, wherein the alloy comprises a grain pinning dispersion of MC, $M_2C$, MB, $M_3B_2$, $M_2B$, or $B_2M$ particles, or a combination thereof, wherein M, at each occurrence, is independently selected from the group consisting of niobium, vanadium, titanium, tungsten, tantalum, hafnium, ruthenium, and molybdenum.

10. The alloy of claim 1, wherein niobium, vanadium, ruthenium, boron, and carbon atoms, or a combination thereof, enhance grain boundary cohesion.

11. The alloy of claim 1, wherein the average grain width of the alloy is 15 to 60 microns.

12. The alloy of claim 1, wherein the alloy comprises 0.01% to 0.54% niobium.

13. The alloy of claim 12, wherein the alloy has a ductile to brittle transition temperature (DBTT) of 0° C. or less.

14. The alloy of claim 1, wherein the alloy is selected from the group consisting of:
   an alloy comprising about 0.41% vanadium, about 0.01% carbon, about 0.54% niobium, about 0.43% titanium, and about 0.024% boron; and an alloy comprising about 0.32% vanadium, about 0.01% carbon, about 0.07% niobium, and about 0.024% boron.

15. A method for producing an alloy, the method comprising:
preparing a melt that includes, by weight,
0.01% to 1% vanadium,
0% to 0.04% carbon,
0.01% to 6.5% niobium,
0% to 1% titanium,
about 0.024% to 0.04% boron,
0% to 1% tungsten,
0% to 1% tantalum,
0% to 1% hafnium, and
0% to 1% ruthenium,
the balance molybdenum and incidental elements and impurities.

16. The method of claim 15, wherein the melt is produced via double alternating current consumable electrode vacuum melting as ingots with specified dimensions.

17. The method of claim 16, further comprising extruding the ingots into shapes of specified dimensions.

18. The method of claim 17, wherein the ingots are extruded at 1350° C.

19. A manufactured article comprising an alloy that includes, by weight,
0.01% to 1% vanadium,
0% to 0.04% carbon,
0.01% to 6.5% niobium,
0% to 1% titanium,
about 0.024% to 0.04% boron,
0% to 1% tungsten,
0% to 1% tantalum,
0% to 1% hafnium, and
0% to 1% ruthenium,
the balance molybdenum and incidental elements and impurities.

20. The article of claim 19, wherein the article is at least one of a rocket thruster, a rocket engine nozzle, or a turbine engine.

* * * * *